United States Patent
Liu

(10) Patent No.: US 10,949,222 B2
(45) Date of Patent: Mar. 16, 2021

(54) SYSTEM AND METHOD FOR DISPLAYING CUSTOMIZED USER GUIDES IN A VIRTUAL CLIENT APPLICATION

(71) Applicant: Citrix Systems, Inc., Fort Lauderdale, FL (US)

(72) Inventor: Lei Liu, Jiangsu (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 363 days.

(21) Appl. No.: 15/608,144

(22) Filed: May 30, 2017

(65) Prior Publication Data
US 2018/0352082 A1   Dec. 6, 2018

(51) Int. Cl.
*G06F 9/451* (2018.01)
*G06F 3/0481* (2013.01)
*H04L 29/08* (2006.01)

(52) U.S. Cl.
CPC .......... *G06F 9/451* (2018.02); *G06F 3/04812* (2013.01); *G06F 3/04817* (2013.01); *G06F 9/453* (2018.02); *H04L 67/36* (2013.01)

(58) Field of Classification Search
CPC ...... G06F 9/451; G06F 9/453; G06F 3/04812; G06F 3/04817; H04L 67/36
See application file for complete search history.

(56) References Cited

U.S. PATENT DOCUMENTS

| | | | | |
|---|---|---|---|---|
| 4,789,962 A | * | 12/1988 | Berry | .................. G06F 3/04895 715/715 |
| 4,964,077 A | * | 10/1990 | Eisen | ...................... G06F 9/453 715/707 |
| 5,546,521 A | * | 8/1996 | Martinez | .................. G06F 9/453 715/711 |
| 5,708,787 A | * | 1/1998 | Nakano | .................. G06F 3/0482 715/837 |
| 6,005,569 A | * | 12/1999 | Breggin | .................. G06F 9/453 715/711 |
| 7,284,189 B1 | * | 10/2007 | Lawrence | .............. G06Q 10/10 715/234 |
| 9,116,602 B2 | * | 8/2015 | Kotler | .................. G06F 3/04812 |
| 2008/0133449 A1 | * | 6/2008 | Richardson | ......... G06F 16/9535 |
| 2008/0229197 A1 | * | 9/2008 | Branson | .................. G06F 9/453 715/705 |
| 2009/0282359 A1 | * | 11/2009 | Saul | ...................... G06F 3/0481 715/784 |

\* cited by examiner

*Primary Examiner* — Philip J Chea
*Assistant Examiner* — Robert B McAdams
(74) *Attorney, Agent, or Firm* — Pierce Atwood LLP

(57) ABSTRACT

Systems and methods for displaying a user guide in a Client Virtual Application ("CVA"). The methods include determining, by a client device, a position associated with a user interaction in CVA. The position of the user interaction may be a mouse position relative to the CVA's window or a position of a widget of CVA's window with which the user is interacting via an input device. The client device transfers the position data and application name to a server device on the network. The server device subsequently retrieves, from a content datastore, user guide content associated with the application and position, and transfer the user guide content for rendering on the client device. The server device may also determine a display position and send it to the client device. The client device may render the user guide according to a rendering policy.

24 Claims, 5 Drawing Sheets

| TCP Header | Packet Type | Mouse Event | X Coordinate | Y Coordinate |
|---|---|---|---|---|
| | 1 Byte | 1 Byte | 4 Byte | 4 Byte |

FIG. 3A

| TCP Header | Packet Type | Window Name | X Coordinate | Y Coordinate | Width | Height |
|---|---|---|---|---|---|---|
| | 1 Byte | 4 Byte | 4 Byte | 4 Byte | 4 Byte | 4 Byte |

FIG. 3B

| TCP Header | Packet Type | Customized content text |
|---|---|---|
| | 1 Byte | Optional Length, 1024 Byte by default |

FIG. 3C

SYSTEM AND METHOD FOR DISPLAYING CUSTOMIZED USER GUIDES IN A VIRTUAL CLIENT APPLICATION

BACKGROUND

Statement of the Technical Field

This document concerns implementing systems and methods for displaying customized user guides in a client application. More particularly, the present document concerns implementing systems and methods for displaying user guides in a virtual application.

Description of the Related Art

Existing applications, such as Microsoft® Windows, provide ToolTip Pop-ups that display information boxes every time the mouse pointer hops over certain items in the user interface. Such user guides will display content related to the widget the user is interacting with, which will guide the user with navigating various user interface functions. However, these pop-ups are provided by the provider of the application, and they are application specific and cannot be customized or updated. Users are limited to the user guides the software makers provide. If an application does not provide such user guides, users cannot add any custom user guides without modifying the source codes of the original applications. There is often a need for complex applications, such as Enterprise Resource Planning ("ERP") and Computer-Aided Design ("CAD") programs, to provide user guides that will be displayed on the display when a user hops the mouse on a particular widget (e.g., a button) or an area in the application. There is also a need for localizing an application in a foreign language by adding user guides in the user's own language associated with certain user interface widgets without having to modify the source code of the application, even if it is made available.

SUMMARY

The present document relates to implementing systems and methods for displaying a user guide in a client virtual application. The methods include: launching the client virtual application on a client device; virtualizing, by a processor of a server device, a host target application; and determining a position associated with a user interaction in the client virtual application by a processor of the client device. The position of the user interaction may be a mouse position relative to the window of the client virtual application, or a position of a widget of the window of the client virtual application with which the user is interacting via an input device. The methods also include: transferring position data representing the position of the user interaction from the client device to a server device; and receiving the position data by the server device. The server device uses the position data to retrieve from a content datastore user guide content associated with the user interaction represented by the position data, and transfer the user guide content to the client device. Upon receiving the user guide content, the client device renders the user guide content on a display according to a rendering policy.

The methods may also include determining, by the processor of the server device, a display position for displaying the user guide content in the window of the client virtual application. The server device may further transfer the display position to the client device, which may display the user guide content at the display position in the window of the client virtual application. In some scenarios, the method may also include assembling the data into one or more data packets suitable for a transport protocol before transmitting the data to a client or server device.

The method may also include detecting, by the processor of the client device, a display change to the window of the client virtual application. The display change to the window of the client virtual application may be a move or a scaling of the window by the user. Upon detecting the display change to the window, the client device may transfer the information about the change to the window to the server device. The server device receives the information about the change to the window and uses that information to determine a new display position of the user guide content. The server device may further transfer the new display position to the client device, which receives the new display position and renders the user guide content at the new display position on the display of the client device, according to the rendering policy.

The methods may further include authoring the contents in the content datastore by the server device. The server device may launch a target application and receive one or more position data representing a position relative to a window of the target application. Each position is associated with one or more user actions in the target application. For each position data, the server device may determine a user guide content associated with the user action represented by the position data, and write the user guide content and the position data to the content datastore. The user guide content and the position data are stored in the content datastore associated with the target application.

BRIEF DESCRIPTION OF THE DRAWINGS

The present solution will be described with reference to the following drawing figures, in which like numerals represent like items throughout the figures.

FIGS. 3A-3C (collectively referred to as FIG. 3) provide illustrations of exemplary data packets.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The term "user guide content" or "instructive user guide" or "user guide" refers to a text that provides instructions or guides associated with a particular user action in an application. For example, for a "Take Action" button in the application, an associated user guide content may include a text explaining what "Take Action" is about. When a user is performing a particular user action in an application or exploring certain functions of the application, displaying a user guide content concurrently in the application may help user to understand the application and have sufficient information before take an action, and thus provide better user experience.

This patent disclosure describes solutions to render customized contents which contain instructive user guides to a user using application delivered to a client device through virtualization techniques. Users who use the virtualized application can get the customized instructive user guides when they perform a user interaction, such as moving a mouse to a specified button, menu or area in the application window. The features to be described do not require the application itself to provide any user guide contents, but can be used for any applications that run in a virtualization environment on any platform.

Figure 1:
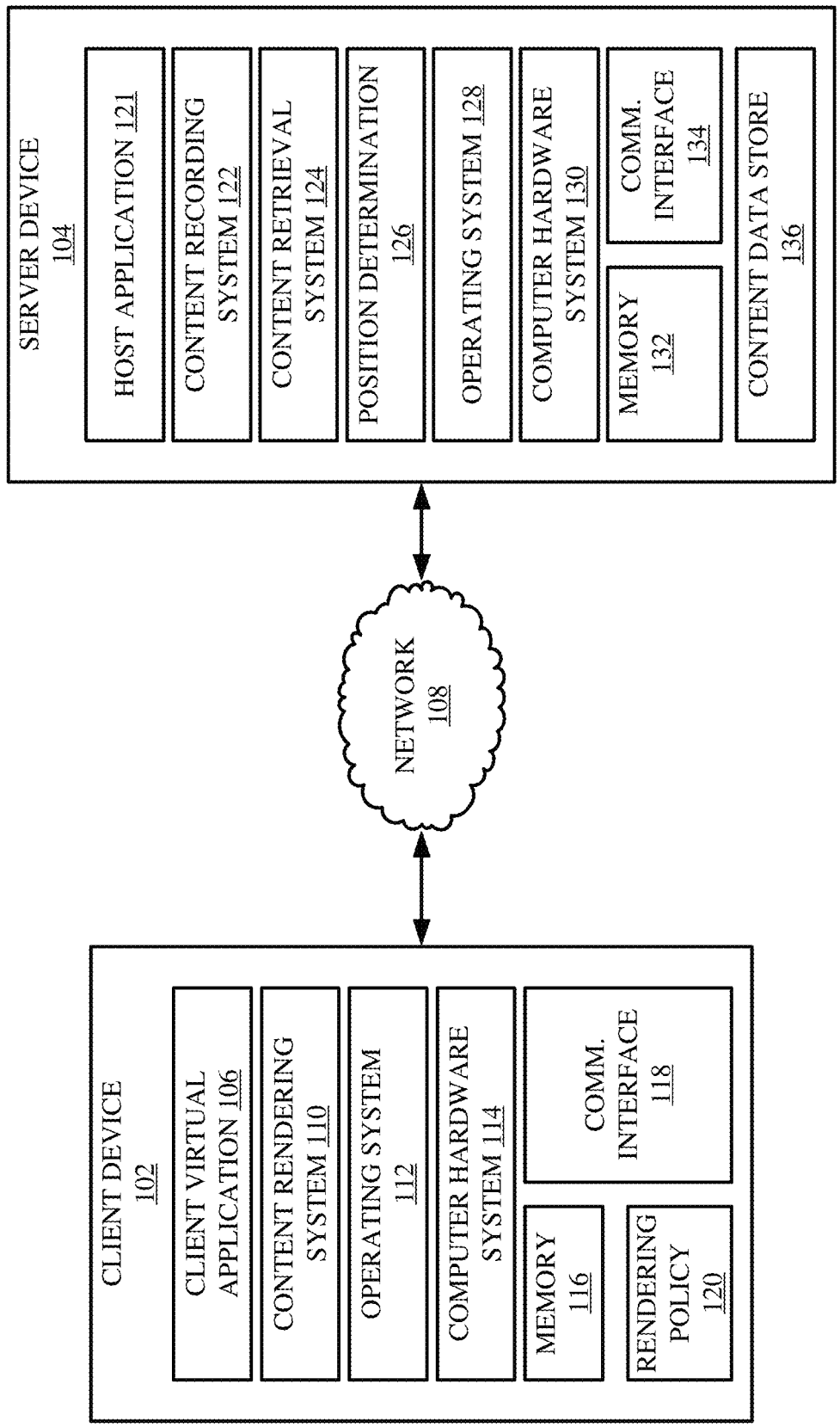
FIG. 1 provides an illustration of an exemplary virtualization environment.

Referring now to FIG. 1, a virtualization environment includes at least a client device 102 and a server device 104 that communicate via a network 108. The client device 102 includes computer hardware components 114, a memory 116, and a communication interface 118. The computer hardware components 114 include a processor and other components such as display, storage medium, input/output devices and/or other sensors. Details of the hardware components will be further explained in detailed later in the document. The memory 116 contains programming instructions for operating the device. The memory 116 may also contain other user data associated with an application running on the client device. The communication interface 118 enables an application (e.g., a client virtual application) to communicate with the server device or other devices via the network 108. The communication interface may be configured to operate in a wired communication protocol (e.g., Ethernet) or wireless communication protocol (e.g. Wi-Fi, Bluetooth, Infrared or Near-Field Communication ("NFC") or any other radio-based communication protocols).

The client device 102 also includes an operating system 112 that may run one or more client virtual applications 106. The client device may also include a content rendering system 110 that renders the client virtual applications and other applications using one or more rendering policies 120. A rendering policy 120 defines how to display certain contents on the client virtual application screen or window, such as special rendering effects (e.g., shading, size and color of text), duration of floating or pop-up content, and/or overlaying mode (e.g., half-transparent so that a user guide will not obstruct the original application), etc. The content rendering system will use the rendering policy to display the window contents, such as displaying an instructive user guide in a pop-up window at a specified window position for a specified duration of time.

The server device 104 includes computer hardware components 130, a memory 132 and a communication interface 134, which are similar to those on the client device. The server device 104 also includes an operation system 128 that may run one or more host applications 121. The server device 104 may deliver a virtual client application to a client device. The virtual client application on the client device may be in communication with a host application 121 on the server device. For example, when a user moves a mouse in the client virtual application 106, the mouse position will be determined by the client virtual application and then transferred to the host application 121 on the server. Likewise, the host application 121 on the server device 104 may send user guide content and/or display position to the client device 102 for displaying in the client virtual application 106.

The server device 104 may also include a content datastore 136 that stores the contents of instructive user guides and associated data. The associate data may include the name of the application, window name, and/or position coordinates relative to a window of the client virtual application, at which the instructive user guide will be displayed. The content datastore may be stored in any suitable data structure in any suitable database, such as a relational database, Microsoft® Access database, Excel, csv (comma separated vector) files, or any flat-file system.

The server device 104 may also include a content retrieval system 124 that is configured to retrieve pre-stored contents from the content datastore 136. The content retrieval system 124 may use the name of the client virtual application that sends the request (for retrieving user guide), the window name, the mouse position and/or other information related to a user interaction in the client virtual application to retrieve relevant user guide content. For example, the client virtual application 106 sends information that includes the name of the application N along with a mouse position (x, y) relative a window of the application N. The content retrieval system 124 uses this information to retrieve user guide content (e.g., in text) that describes a user action item (e.g., a button or a menu item) proximate to the mouse position (x, y). The present solution is not limited to the particulars of this example.

Additionally or optionally, the server device 104 includes a position determination system 126 that can be configured to calculate or re-calculate a display position relative to the window of the client virtual application 106, at which the user guide content should be displayed. The position determination system 126 uses the current mouse position (or the position representing the current user interaction), the size/scale of the window of the client virtual application, and/or the content of the user guide to determine the display position. For instance, if the current mouse position is near the center of the window of the client application, the position determination system 126 determines that the user guide is to be displayed proximate to the current mouse position but in an area that is less busy or obstructive in the application user interface. The position determination system 126 may also calculate the size of a pop-up window that will contain the content of the user guide or the starting position of the pop-up window depending on the size of the pop-up window.

Additionally or optionally, the service device 104 includes a content recording system 122 configured to allow a user to author and store user guide contents in the content datastore 136. The details will be further explained later in this document.

Figure 2:
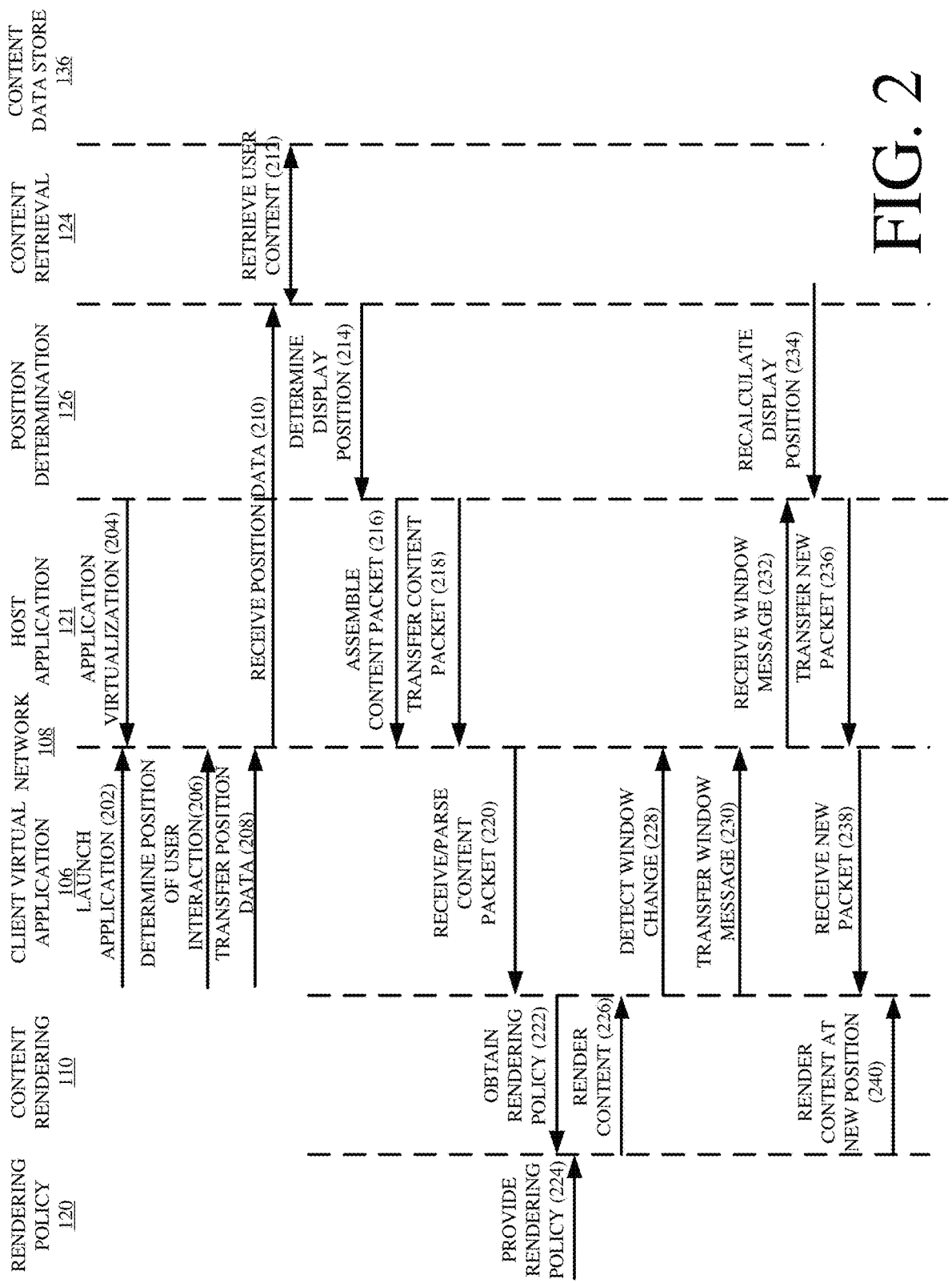
FIG. 2 provides a messaging diagram of a process for displaying user guides in a client virtual application.

Various methods can be implemented on the devices and network environment described above. A messaging flow diagram is provided in FIG. 2 which is useful for understanding a method in which a user guide is rendered in a client virtual application. The method involves launching the client virtual application by the client device, as shown by 202. This involves a remote server delivering the application to the client device and the client device launching the application. When the application is launched, a virtualized application is rendered on the client side as shown by 204. The virtualized application communicates with the server device via the network. A host target application is virtualized by the server device.

Next as shown by 206, the processor of the client device determines a position associated with a user interaction in the client virtual application 206. The position is determined relative to a window of the client virtual application. In some scenarios, the position associated with the user interaction is a mouse position relative to the window of the client virtual application. The client device may capture this mouse position whenever the user moves the mouse or hops the mouse on a widget of interest in the window. Additionally or alternatively, the position associated with the user action is a position of a widget of a window of the client virtual application with which the user is interacting. The client virtual application may determine this position via an input device. The input device includes, but is not limited to, a keyboard, a mouse, a microphone that takes a voice command from the user, a camera that takes user's input (e.g., a user gesture), and/or other sensors.

In 208, position data representing the position of the user interaction 208 is transferred from the client device to the server device. The position data is received by a processor of the server device, as shown by 210. After reception of the position data, the server device uses the position data to retrieve, from a content datastore, user guide content associated with the user interaction represented by the position data, as shown by 212.

The processor of the server device also assembles a content packet with the user guide content in 216 and transfers content packet to the client device in 218. The user guide content is received by the processor of the client device in 220. The client device obtains a rendering policy in 222 by querying from the content rendering system. The content rendering system provide the rendering policy in 224 by checking the policy internally. The client device further renders the user guide content in 226 on a display of the client device according to the rendering policy.

Alternatively or additionally, the server device further determines a display position in 214 for displaying the user guide in the window of the client virtual application. An exemplary method for determining the display position is disclosed above with respect to the position determination system 126 of FIG. 1. The server device transfers the display position to the client device along with the user guide content in 218. The client device receives the display position from the server device along with the user guide content in 220. When rendering the user guide content on the display of the client device, the client device displays the user guide content at the display position received from the server device in the client virtual application.

In some scenarios, the method further includes operations 228-240. 228 involves detecting, by the client device, a display change to the window of the client virtual application. The display change includes, but is not limited to, a move of the window or a scaling of the window by the user. When the display change to the window occurs, the client virtual application may need to update the position for rendering user guides. To do so, the client device may further transfer information about the display change to the window to the server device as shown by 230. In this case, the server device receives the information about the client window in 232, and uses the information about the client window to determine or recalculate a new display position in 234. The new display position is determined here with respect to the position determination system 126 of FIG. 1. The server device transfers the new display position to the client device in 236. Subsequently, the client receives the new display position in 238 and renders the user guide content at the new display position in 240 according to the rendering policy.

Alternatively or additionally, before transferring the user guide content in 218 and/or the display position in 236, the server device assembles the data into one or more data packets suitable for the transfer protocol used for transferring to the client device. The client device receives the data packets, parses the data packets, and extracts the user guide content and/or the display position therefrom. Similarly, before transferring the position associated with the user interaction or display change to the client window in 206 and/or 230, the client device may also assemble this data into one or more data packets for the transfer protocol in transferring to the server device. The server device receives the data packets, parses the data packets, and extracts the position data therefrom. The transfer protocol for transferring data packets between the client device and server device can be any suitable transfer protocol (e.g., TCP/IP, RDP, HTTP, NX, NLP, PCoIP, SSH, X11, XDMCP, SPICE or Citrix ICA protocol).

Referring now FIGS. 3A-3C, there is provided some examples of data packets for transferring data between the server device and client device. FIG. 3A shows an example of a mouse packet for TCP transfer from the client device to the server device. The mouse packet includes a one-byte packet type. The packet type has the value of MOUSE, WINDOW, CONTENT or others. In the case that it is a packet for mouse position, the packet type is "MOUSE," and the data packet further includes a one-byte mouse event followed by four-byte X-coordinate and four-type Y-coordinate. The mouse event may include, but is not limited to, mouse moving, mouse click, and/or mouse double click. The X- and Y-coordinates contain the values of x and y coordinates of the current mouse position in the client virtual application, respectively. The packet or any particular field of the packet can also be of other size.

FIG. 3B shows an example of a window packet for TCP transfer from the client device to the server device. The window packet contains a one-byte packet type, a four-byte Window Name, followed by four-byte X-coordinate and four-byte Y-coordinate, and Width and Height, each having four bytes also. In the case that it is a packet for window information, the packet type is WINDOW. The Window Name is a name that can uniquely identify the client application window. As described above, the user guide contents are stored and associated with each application. The Window Name can be used by the server device to correctly retrieve a particular user guide content associated with each specific client virtual application.

FIG. 3C shows an example of a content packet for TCP transfer from the server device to the client device. The content packet contains a one-byte packet type, followed by variable length content text that contains the user guide content for rendering on the client device. If it is a packet for user guides, the packet type is CONTENT.

Figure 4:
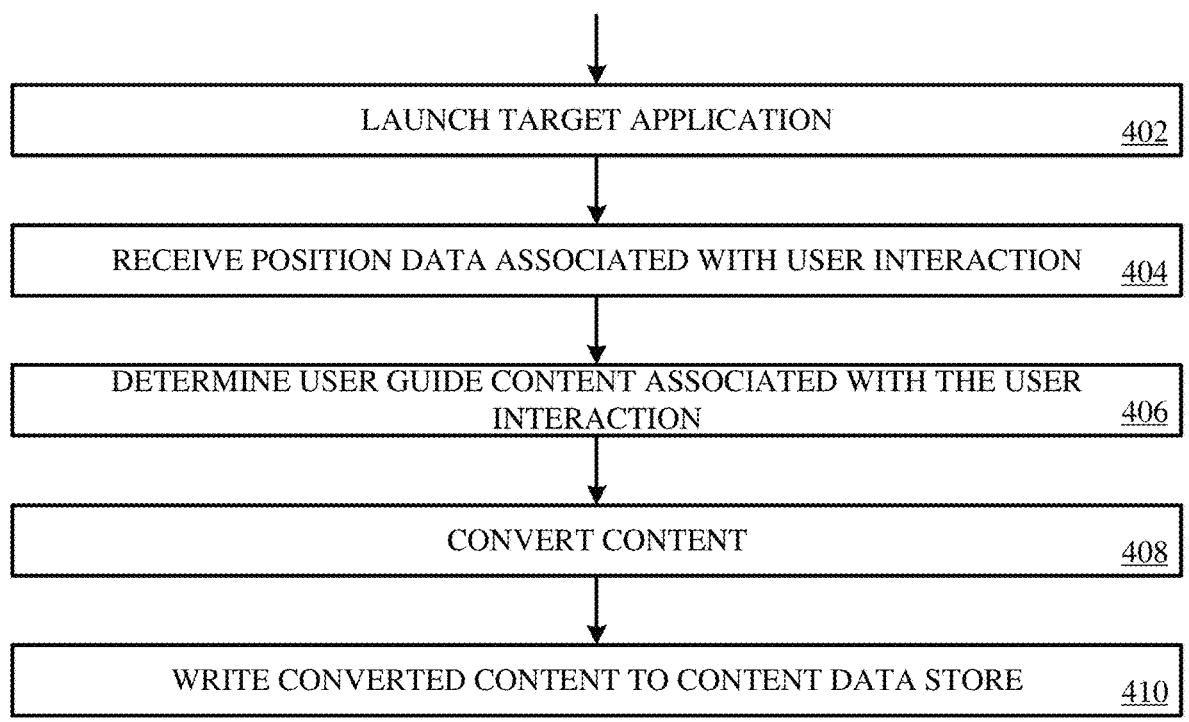
FIG. 4 is a flow diagram of an exemplary a method for authoring and storing user guide contents in the content datastore by the server device.

As described above in FIG. 1, the server device may include a content recording system 122 configured to author and store user guide content in the content datastore 136. FIG. 4 provides a flow diagram of an exemplary method for authoring and storing user guide content in the content datastore by the server device. The methods includes launching a target application as shown by 402. Subsequently, the content recording system of the server device obtains the application name of the target application. In 404, the server device receives position data representing a position relative to a window of the target application. The position is associated with one or more user actions in the target application. For example, a user (or administrator for authoring the content) clicks anywhere in the target application window where instructive user guide content needs to be displayed. The server device then captures the position where the user click occurred. The present solution is not limited to the particulars of this example.

In 406, a determination is made as to which user guide content is associated with the user action 406 represented by the position data. There are various ways of determining the user guide content. For example, when receiving a user click by the user (or administrator) in the target application window, the content recording system may prompt the user with an input box for the user to enter the text of the user guide. In another example, the content recording system may provide the user with a drop-down menu, each item of which contains a detailed text for user to select. In some scenarios, the user guide content can also contain graphics, audio or other media. The present solution is not limited to the particulars of these examples or scenarios.

In 410, the determined user guide content and the associated position data is written to the content datastore 410. The user guide content and the position data are stored in the content datastore associated with the target application. Additionally, the user guide content is converted in 408 to an internal data structure suitable for the content datastore before writing the content to the content datastore.

Figure 5:
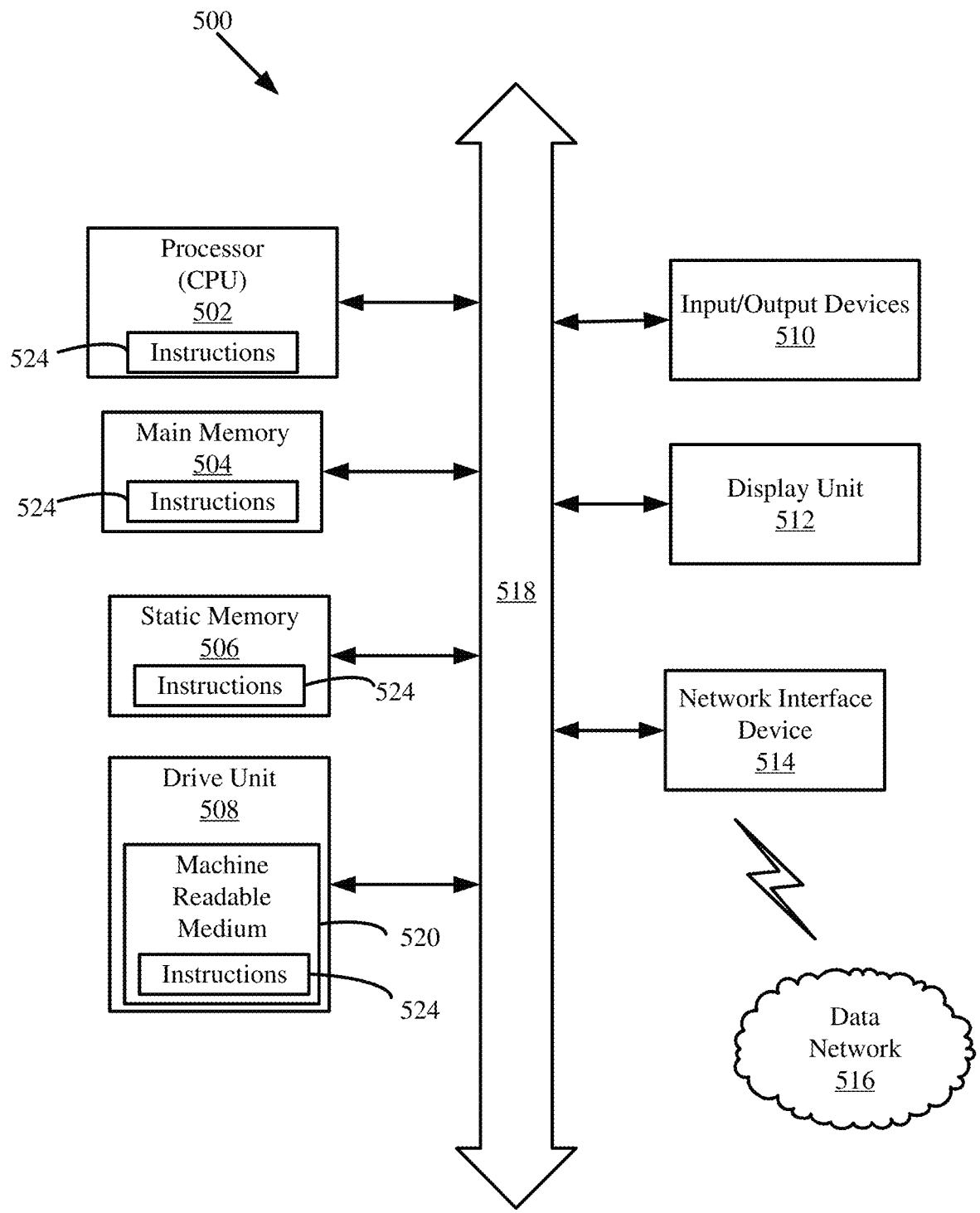
FIG. 5 provides a hardware block diagram of an exemplary architecture for a computer system.

Referring now to FIG. 5, there is provided a hardware block diagram of an exemplary architecture for a computer system 500. The computer system 500 includes a set of instructions which are used to cause the computer system to perform any one or more of the methodologies discussed herein. In a networked deployment, the computer system 500 can function as a server device (e.g., client device 104 of FIG. 1) or a client device (e.g., client device 102 of FIG. 1). The computer system 500 can correspond to each of the client device, the server device, a content rendering system (e.g., content rendering system 110 of FIG. 1), a content recording system (e.g., content recording system 122 of FIG. 1), a content retrieval system (e.g., content retrieval system 124 of FIG. 1), and/or the position determination system (e.g., position determination system 126 of FIG. 1). In some scenarios, the computer system 500 operates independently as a standalone device. However, the present solution is not limited in this regard. In other scenarios, the computer system 500 is operatively connected (networked) to other machines in a distributed environment to facilitate certain operations described herein. Accordingly, while only a single computer system is illustrated in FIG. 5, it should be understood that the present solution can be taken to involve any collection of machines that individually or jointly execute one or more sets of instructions as described herein.

As shown in FIG. 5, the computer system 500 comprises a processor 502 (e.g., a Central Processing Unit ("CPU"), a main memory 504, a static memory 506, a drive unit 508 comprised of machine readable media 520, input/output devices 510, a display unit 512 (e.g., a Liquid Crystal Display ("LCD"), a solid state display, or a Cathode Ray Tube ("CRT")), and a network interface device 514. Communications among these various components can be facilitated by means of a data bus 518. One or more sets of instructions 524 are stored completely or partially in one or more of the main memory 504, static memory 506, and drive unit 508. The instructions can also reside within the processor 502 during execution thereof by the computer system.

The input/output devices 510 include, but are not limited to, a keyboard, a mouse, a multi-touch surface (e.g. a touchscreen), a microphone, and/or a camera. In the case that the computer system 500 is a client device, the input devices 510 may be used by the client device to determine a mouse position or a position associated with a user interaction in a client virtual application.

The network interface device 514 is comprised of hardware components and software or firmware to facilitate wired or wireless network data communications in accordance with a network communication protocol utilized by a data network 516.

The drive unit 508 comprises a machine readable medium 520 on which is stored one or more sets of instructions 524 (e.g., software) which (is)are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media include, but are not limited to, magnetic media, solid-state memories, and/or optical-media. More particularly, tangible media as described herein can include, but is not limited to, magnetic disks, magneto-optical disks, CD-ROM disks, DVD-ROM disks, semiconductor memory devices, Electrically Erasable Programmable Read-Only Memory ("EEPROM"), and/or flash memory devices. A tangible medium as described herein is one that is non-transitory insofar as it does not involve a propagating signal.

A computer system as referenced herein can comprise various types of computing systems and devices, including a server computer, a client user computer, a Personal Computer ("PC"), a tablet PC, a laptop computer, a desktop computer, a control system, a network router, switch or bridge, or any other device capable of executing a set of instructions (sequential or otherwise) that specifies actions to be taken by that device. Further, while a single computer is illustrated, the phrase "computer system" shall be understood to include any collection of computing devices that individually or jointly execute a set (or multiple sets) of instructions to perform any one or more of the methodologies discussed herein.

Accordingly, computer system 500 should be understood to be one possible example of a computer system which can be used in connection with the present solution However, the present solution is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In accordance with various embodiments of the present solution, the methods described herein are stored as software programs in a machine-readable storage medium and are configured for running on a computer processor. Furthermore, software implementations can include, but are not limited to, distributed processing, component/object distributed processing, parallel processing, and/or virtual machine processing (which can also be constructed to implement the methods described herein). In the present solution, a network interface device 514 connected to a network environment communicates over the network using the instructions 524.

While the machine-readable storage medium 520 is shown in an example of a single storage medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any tangible medium that is capable of storing, encoding or carrying a set of instructions for execution by the machine and that cause the machine to perform any one or more of the methodologies of the present disclosure.

The term "machine-readable storage medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a machine-readable medium as listed herein and to include recognized equivalents and successor media, in which the software implementations herein are stored.

Optionally, the hardware may not need to include a memory, but instead programming instructions are running on one or more virtual machines or one or more containers on a cloud. For example, the server device (e.g., server device 104 of FIG. 1) may be a server on a cloud that includes multiple virtual machines, each virtual machine having an OS, a virtual disk, virtual network and Apps, and the programming instructions for implementing various functions in the print system may be stored on one or more of those virtual machines on the cloud.

The various systems and methods disclosed in this patent document provide advantages over the prior art, whether standalone or combined. For example, this disclosure provides a technical solution that can be implemented in a virtual environment based on a network transport protocol, such as Citrix ICA protocol or other protocols used by other remote desktop software. This disclosure enables recording instructive user guide contents in a virtualized application hosted on the server, which allows a user (or administrator) to provide a customized template of the instructive guide contents for any published applications without having to modify the source code of the original applications. During the use of the virtualized application by the client device, the recorded instructive user guide contents and the associated relative positions will be transferred from the server device to the client device, and will be automatically rendered on a display of the client device while the user is performing a user interaction in the client application.

The various systems and methods illustrated in this patent disclosure can be implemented in various new or existing systems. For example, the content recording system (e.g., content recording system 122 of FIG. 1) can be integrated in Citrix Studio as a new option choice. An administrator can record the user guide contents and write the contents to a database through PowerShell. The content recording system can also be implemented as a new optional virtual channel in Citrix ICA protocol: on the server device, it can be loaded and hosted by Wfshell or Poticashell if this feature is configured; on the client device, it can be implemented as a virtual driver and it can use existing rendering technique to render the content on the display. The illustrated systems and methods can be implemented as a new virtual channel in ICA and can interwork with existing systems, such as Citrix Seamless (used for obtaining application window update information) and Thinwire (used for graphics rendering).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

I claim:

1. A method for displaying a custom user guide content in a client virtual application, comprising:
performing operations by a client device to:
receive information to create the custom user guide content after deployment of the client virtual application,
cause the custom user guide content to be stored, in a content datastore, in association with position data specifying an interaction position where a user interaction can occur within a window of the client virtual application,
launch the client virtual application,
determine an active position associated with a user interaction relative to a window of the client virtual application,
cause to be obtained, from the content datastore, the custom user guide content having the interaction position which corresponds to the active position, and
render on a display of the client device the obtained custom user guide content according to a rendering policy at the active position.

2. The method of claim 1, wherein the active position associated with the user interaction relative to the window of the client virtual application comprises:
a mouse position relative to the window of the client virtual application; or
a position of a widget of the window of the client virtual application with which a user is interacting via an input device.

3. The method of claim 1, further comprising:
detecting, by a processor of the client device, a display change to the window of the client virtual application;
transferring, by the processor of the client device, information about the display change to the window to a server device
receiving, by the processor of the client device, a new display position; and
rendering on the display the custom user guide content at the new display position according to the rendering policy.

4. The method of claim 3, wherein the display change to the window of the client virtual application comprises a move or a scaling of the window by a user.

5. The method of claim 1, wherein the client device causes the custom user guide content to be stored, in the content datastore, in association with the position data at least in part by:
launching a target application;
receiving one or more position values each representing an interaction position relative to a window of the target application, each position value being associated with one or more user actions in the target application; and
for each position value:
receiving the custom user guide content associated with the user action represented by the position value, and
writing the custom user guide content and the position value to the content datastore;
wherein the custom user guide content and the position value are stored in the content datastore and are associated with the target application.

6. The method of claim 1, further comprising:
receiving, by the client device, a display position for displaying the custom user guide content in the window of the client virtual application;
wherein the custom user guide content is rendered on the display of the client device by displaying the custom user guide content at the display position in the window of the client virtual application.

7. The method of claim 6, further comprising:
parsing, by the client device, one or more data packets to extract the custom user guide content and the display position;
wherein the custom user guide content and the display position is transferred to the client device via the one or more data packets using a network transportation protocol.

8. The method of claim 7, wherein the network transportation protocol comprises TCP/IP, RDP, HTTP, NX, NLP, PCoIP, SSH, X11, XDMCP, SPICE or Citrix ICA protocol.

9. A client system for displaying a user guide content in a client virtual application, comprising:
a processor;
a communication interface;
a display; and
a non-transitory computer-readable storage medium containing programming instructions that will cause the processor to:
receive information to create the user guide content,
cause the user guide content to be stored, in a content datastore, in association with position data specifying an interaction position where a user interaction can occur with a window of the client virtual application, launch the client virtual application having the window,
determine an active position associated with a user interaction relative to a window of the client virtual application,
cause to be obtained from the content datastore, the user guide content having the interaction position which corresponds to the active position, and
render on the display the obtained user guide content according to a rendering policy.

10. The client system of claim 9, wherein the active position associated with the user interaction relative to the window of the client virtual application comprises:
a mouse position relative to the window of the client virtual application; or
a position of a widget of the window of the client virtual application with which a user is interacting via an input device.

11. The client system of claim 9, further comprising programming instructions configured to:
detect a display change to the window of the client virtual application;
communicate information about the display change to the window;
receive a new display position for the user guide content, wherein the new display position is based at least on the display change to the window; and render on the display the user guide content at the new display position according to the rendering policy.

12. The client system of claim 11, wherein the display change to the window of the client virtual application comprises a move or a scaling of the window by a user.

13. The client system of claim 9, further comprising programming instructions to:
   determine a display position in the window of the client virtual application after receiving the user guide content; and
   display the user guide content at the display position in the window of the client virtual application.

14. The client system of claim 9, wherein data is transferred to/from the client system using a network transportation protocol selected from a group consisting of TCP/IP, RDP, HTTP, NX, NLP, PCoIP, SSH, X11, XDMCP, SPICE and Citrix ICA protocol.

15. A server system for displaying a user guide content in a client virtual application, comprising:
   a processor;
   a communication interface; and
   a non-transitory computer-readable storage medium containing programming instructions that will cause the processor to:
      facilitate receipt of information for creation of the user guide content,
      cause the user guide content to be stored, in a content datastore, in association with position data specifying an interaction position where a user interaction can occur with a window of the client virtual application,
      receive active position data representing an active position associated with a user interaction relative to a window of the client virtual application,
      use the active position data to retrieve, from the content datastore, the user guide content having the interaction position which corresponds to the active position, and
      transfer the retrieved user guide content through the communication interface for rendering in the window of the client virtual application.

16. The server system of claim 15, further comprising programming instructions configured to:
   determine a display position in the window of the client virtual application for displaying the user guide content; and
   transfer the display position with the user guide content to enable rendering of the user guide content at the display position in the window of the client virtual application.

17. The server system of claim 15, wherein the programming instructions configured to cause the user guide content to be stored, in the content datastore, in association with the position data comprise programming instructions configured to:
   launch a target application;
   receive one or more position values, each said position value representing an interaction position relative to a window of the target application, and each said position value being associated with one or more user actions in the target application; and
   for each said position value:
      determine user guide content associated with the one or more user actions associated with the position value, and
      write the user guide content and the position value to the content datastore, wherein the user guide content and the position data are stored in the content datastore and are associated with the target application.

18. The server system of claim 17, wherein the active position of the user interaction in the target application comprises:
   a mouse position relative to the window of the target application; or
   a position of a widget of the window of the target application with which a user is interacting via an input device.

19. The server system of claim 15, further comprising programming instructions configured to:
   receive information about a display change to the window of the client virtual application;
   use the information about the display change to the window to determine a new display position of the user guide content; and
   transfer the new display position for rendering the user guide content at the new display position in the client virtual application.

20. The server system of claim 19, wherein the display change to the window of the client virtual application comprises a move or a scaling of the window by a user.

21. The method of claim 1, further comprising:
   determining a display position for displaying the custom user guide content in the window of the client virtual application;
   re-calculating the display position so that a display of the custom user guide content in the window of the client virtual application results in a reduced amount of obstruction of an application user interface; and
   providing the re-calculated display position so that the custom user guide content is displayed at the re-calculated display position in the window of the client virtual application.

22. A method for displaying custom user guide content in a client virtual application, comprising:
   performing operations by a server device to:
      facilitate receipt of information for creation of the custom user guide content,
      cause the custom user guide content to be stored, in a content datastore, in association with position data specifying an interaction position where a user interaction can occur with a window of the client virtual application,
      receive an active position data representing an active position associated with a user interaction relative to a window of the client virtual application,
      use the active position data to retrieve, from the content datastore, the custom user guide content having the interaction position which corresponds to the active position, and
      transfer the retrieved custom user guide content through a communication interface for rendering in the window of the client virtual application.

23. The method of claim 22, further comprising, by the server device:
   determining a display position in the window of the client virtual application for displaying the custom user guide content; and
   transferring the display position with the custom user guide content to enable rendering of the custom user guide content at the display position in the window of the client virtual application.

24. The method of claim 22, wherein the active position associated with the user interaction relative to the window of the client virtual application comprises:

a mouse position relative to the window of the client virtual application; or a position of a widget of the window of the client virtual application with which a user is interacting via an input device.

\* \* \* \* \*